United States Patent
Tsuchitani et al.

(10) Patent No.: US 6,772,109 B2
(45) Date of Patent: *Aug. 3, 2004

(54) MESSAGE HANDLING METHOD, MESSAGE HANDLING APPARATUS, AND MEMORY MEDIA FOR STORING A MESSAGE HANDLING APPARATUS CONTROLLING PROGRAM

(75) Inventors: Hajime Tsuchitani, Kamakura (JP); Akifumi Nakada, Kawasaki (JP); Osamu Furusawa, Sagamihara (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,615

(22) Filed: Jun. 4, 1998

(65) Prior Publication Data

US 2002/0055846 A1 May 9, 2002

(30) Foreign Application Priority Data

Jun. 10, 1997 (JP) .............................. 9-152170

(51) Int. Cl.[7] ...................... G06F 15/163; G06F 15/177
(52) U.S. Cl. ............................ 704/2; 709/202; 709/228
(58) Field of Search ..................... 707/103; 395/200.31, 395/200.32, 200.33, 683, 670, 705; 709/202, 203, 227, 228, 313; 704/2, 3, 7, 9

(56) References Cited

U.S. PATENT DOCUMENTS

| 5,867,175 | A | * | 2/1999 | Katzenberger et al. ..... 345/473 |
| 5,953,716 | A | * | 9/1999 | Madnick et al. ............... 707/4 |
| 6,012,074 | A | * | 1/2000 | Lucas et al. ................. 707/531 |
| 6,052,732 | A | * | 4/2000 | Gosling ...................... 707/103 |
| 6,065,039 | A | * | 5/2000 | Paciorek ..................... 709/202 |
| 6,233,601 | B1 | * | 5/2001 | Walsh ........................ 709/202 |

* cited by examiner

Primary Examiner—Richemond Dorvil
Assistant Examiner—Martin Lerner
(74) Attorney, Agent, or Firm—Koichiro Kato Perman & Green, LLP

(57) ABSTRACT

A communication system is provided which, upon communication, is capable of making a suitable response by using interpretation execution parts which conform to the background concepts and vocabularies of a conversation. A flexible and smooth information exchange and cooperation are realized among, and between, agents and an existing system by dynamically allocating suitable interpretation execution parts which include an interpreter in conformance to a variety of agent communication languages, content describing languages and ontologies. The agent communication system in a preferred embodiment of this invention is provided with an interpretation execution part control function that scans a directory of interpretation parts such as conversation content monitoring parts, interpreters and translators, upon the time of execution start or during execution, and forms and maintains an interpretation execution part table that defines what interpretation execution parts exist.

20 Claims, 13 Drawing Sheets

| MESSAGE TYPE | CONVERSATION CONTENT MONITORING PART |
|---|---|
| ask-if | ask-if MONITORING PART |
| sorry | sorry MONITORING PART |
| ⋮ | ⋮ |
| recruit-all | recruit-all MONITORING PART |

| AGENT COMMUNICATION LANGUAGE | TRANSLATOR |
|---|---|
| KQML | KQML-FIPA |
| ⋮ | ⋮ |
| FIPA | FIPA-KIF |

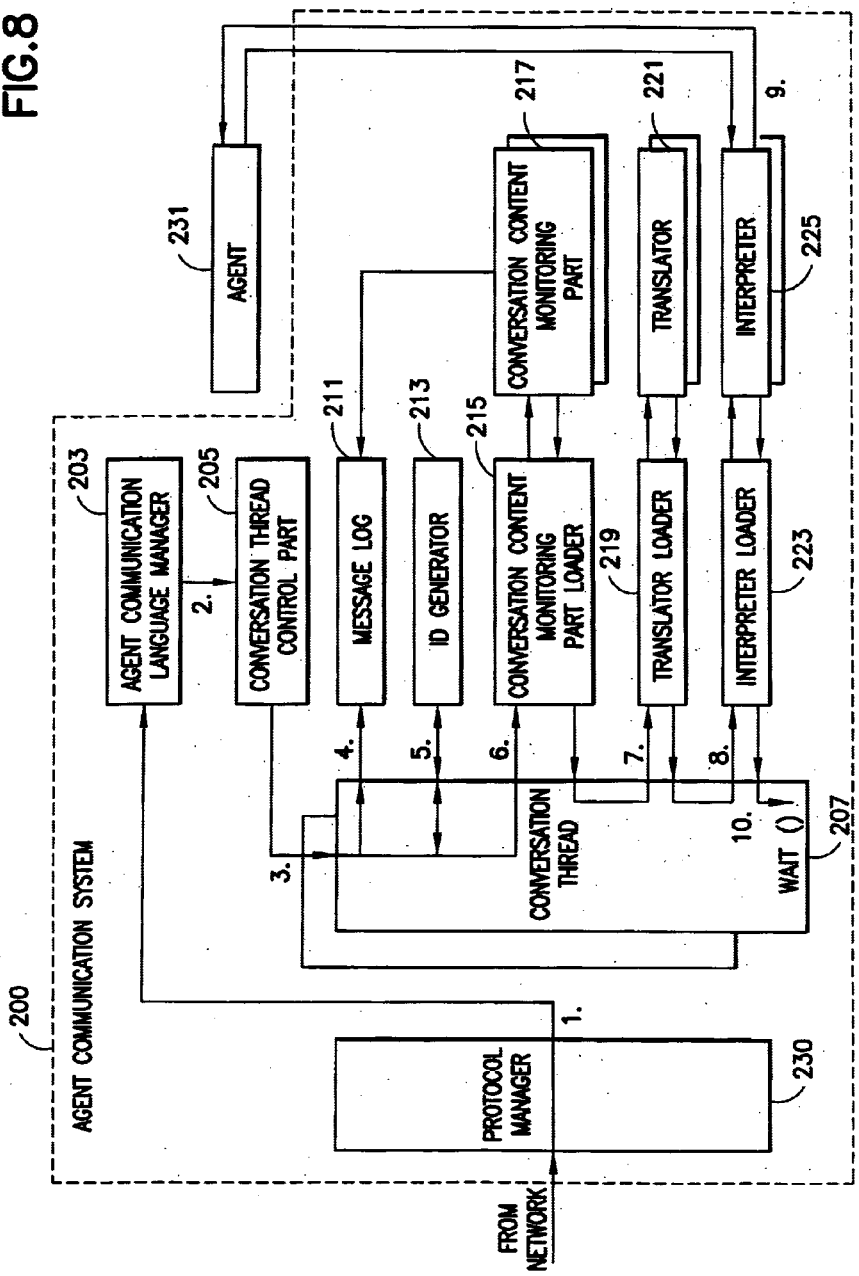

| INTERPRETER | AGENT COMMUNI-CATION LANGUAGE | DESCRIBING LANGUAGE | ONTOLOGY |
| --- | --- | --- | --- |
| interpreter A | KQML | Prolog | Stock |
| interpreter B | FIPA | SL | Stock |
| ... | ... | ... | ... |
| interpreter X | KQML | KIF | Yellow Page |

MESSAGE HANDLING METHOD, MESSAGE HANDLING APPARATUS, AND MEMORY MEDIA FOR STORING A MESSAGE HANDLING APPARATUS CONTROLLING PROGRAM

BACKGROUND OF THE INVENTION

1. Field of the Invention

This invention relates to a data processing technique, and more particularly, to a technique of dynamically changing processing resources depending on the contents of data to be processed.

2. Description of Related Art

A human being is usually capable of determining on what topic a conversation is going and how the utterance by a speaker is interpreted during the course of the conversation from the environmental conditions including the situation in which the speaker is placed, experiences in the past, the identity of the speaker and the flow of the conversation. For instance, suppose that a person sitting in a tea room simply tells to a waitress "a coffee". The waitress would then interpret the statement in a way that the guest agrees to pay the price of a hot coffee listed on a menu placed in the seat and orders a cup of hot coffee poured in a coffee cup. The waitress further recognizes that the order is accepted for the person, and understands that she should take steps of preparing a cup of hot coffee, adding a spoon, sugar and cream to the cup of hot coffee, bringing them to the table of the person and waiting until the person pays the price.

However, in a different environmental condition such as where the same statement "a coffee," is uttered to a shopman in a bookstore, the man would not be able to understand the meaning of the utterance. As exemplified above, data is suitably interpreted even if it contains small amount of information when a statement spoken can be flexibly interpreted taking the situation into consideration.

Generally, a "conversation," between human beings consists of steps in which:

1. a speaker prepares a content to be spoken in order to convey the speaker's intent to a listener;
2. the speaker then begins to speak;
3. the listener listens to the speech and understands the flow of the conversation;
4. the listener associates the speech with the background of the speech from what the listener has experienced;
5. the listener understands the content of the speech; and
6. the listener takes an action as a result.

If a messaging system of a computer is defined as one which simulates the message processing of a natural language and is designed for recycling by patterning a conversation in this way, a message which is closer to a natural language than the prior art can be processed. As a result, an intelligent message system can be constructed which is more user friendly and allows a series of packets having a certain context to be exchanged with the flow of contexts being followed.

On the other hand, there is mobile agent technology in the art in which an internal condition is moved to a place which is provided in a server existing on a network in a distributed computer environment to form an instruction in the place where the internal condition is moved. Reference is made to U.S. Pat. No. : 5,603,031, issued Feb. 11, 1997, entitled "System and Method For Distributed Computation Based Upon the Movement, Execution, and Interaction of Processes in a Network", by White et al., (Japanese unexamined patent publication no.: 7–182174) and Fumihiko Nishida, Susumu Fujiwara et al's "Latest Internet Technology, special edition of Nikkei Communication", pp 104–117, Nikkei BP.

Mobile agents operating under the mobile agent technology discussed above make a contact to other agents (a mobile agent or a resident agent) in the moved-to place and may be served as appropriate. As referred to herein, a place is a location provided by a server existing on the network to which the agent moved and which supports a contact among agents and absorbs the differences between the hardwares and between the platforms.

The mobile agent technology enables a mobile agent to act as a proxy of a human being in handling works such as dynamically adjusting a schedule of internal meetings in compliance with the schedule of attendees and status of reservation of conference rooms and acquiring desired information distributed on the network.

However, if in a single place, various types of communications among the agents is supported, a large load is placed on that place, leading to inability of appropriately responding to the content of conversation and extended processing time which is required for the response. Another load is placed to an agent or a software which issues a request when the request for the service becomes complicated due to the support of various types of communications. Further, the communication system is heavily loaded when the amount of data transmitted over the network is increased. When an interpretation execution element which interprets the content of conversation is changed, a problem was encountered in that the system had to be halted temporarily for restart in registration and importation of changed interpretation execution element because the system relied on a single interpretation execution element.

There was a prior art system which had a compatible class correlating table for the replacement with a compatible resource to maintain interconnection during the period when the network is upgraded to a new version (Japanese unexamined patent publication no.: PUPA 7-93235). However, such a prior art system which inspected the internal status of the system and replaced resources as a result of inspection was not able to analyze a received message to dynamically change the interpretation execution element which interprets the received message. In addition, such a prior art system had to prepare an alternative resource for the resource in which a change occurred so as to avoid the system from halting, resulting in additional load of the user.

In view of the disadvantages of the prior art systems described above, it can be appreciated that it would be desirable to provide a system which overcomes these disadvantages.

OBJECTS AND ADVANTAGES OF THE INVENTION

It is a first object and advantage of this invention to provide a communication system for processing conversations between agents that overcomes the foregoing and other problems.

It is another object and advantage of this invention to provide a communication system which is capable of making a suitable response by means of an analysis execution part in conformance to the content (background concepts or vocabularies) of a conversation among agents.

It is a further object and advantage of this invention to provide a message processing system which enables high speed processing by reducing unnecessary decision logic.

It is still another object and advantage of this invention to provide a message processing system in which resources required for execution are decreased.

It is still a further object of this invention to provide a message processing system which realizes high speed parallel conversation processing.

It is still another object of this invention to reduce the work and the time required for developing and maintaining a program as much as possible in providing a support to communication among agents.

It is still a further object of this invention to provide a message processing system which is capable of flexibly dealing with conversations among agents.

It is still another object of this invention to provide a message processing system which gives less load to a communication network.

Further objects and advantages of this invention will become more apparent from a consideration of the drawings and ensuing description.

SUMMARY OF THE INVENTION

The foregoing and other problems are overcome and the objects of the invention are realized by methods and apparatus in accordance with embodiments of this invention. Disclosed is a technique that enables a flexible and smooth information exchange and coordination among agents and between agents and existing systems by dynamically allocating suitable interpretation execution parts in conformance to an ontology which represents an agent communication language, content describing language and a background concept and vocabulary used in a content.

The agent communication system in the preferred embodiment of this invention has an interpretation execution part controlling function which scans a directory of interpretation execution parts including conversation content monitoring parts, interpreters and translators upon start to form and control an interpretation execution part table about what interpretation execution parts are in existence.

When a message of a combination of agent communication language, content describing language and an ontology which do not exist in the table is received, the interpretation execution part store directory is scanned to see if the interpretation execution part corresponding thereto has been added. If it has been added, it is added to the table to have it process the message.

According to one aspect of this invention, a message processing method is provided for execution by a message processor which has a plurality of different interpreters for processing a message received through the network. The method includes the steps of: receiving a message packet containing an ontology specifying information and a content; selecting one or more interpreters among the plurality of different interpreters in conformance to the ontology specifying information contained in the message packet; and interpreting the content contained in the message packet by means of the selected one or more interpreters.

As referred to in this invention, the term "ontology," includes not only "background concepts and vocabularies," which are to be described in the preferred embodiment of this invention, but also a concept including all information which squeeze decision results and reduce decision processes in determining the content of transmitted information.

According to another aspect of this invention, a message processing method is provided for execution by a message processor which has a plurality of different interpreters for processing a message received through the network. The method includes the steps of: receiving a message packet containing an ontology specifying information, a describing language specifying information and a content specifying information; selecting one or more interpreters among the plurality of different interpreters in conformance to the ontology specifying information and describing language specifying information contained in the message packet; and interpreting a content which corresponds to the content specifying information contained in the message packet by means of the selected one or more interpreters.

As referred to herein, the term "content specifying information," includes not only a content per se, but also link information which points to a content.

According to still another aspect of this invention, a message processing method for execution by a message processor which has a plurality of different analysis execution parts. The method includes the steps of: selecting one or more analysis execution parts of the plurality of different analysis execution parts in conformance to the ontology specifying information associated with the content. Further, the method includes interpreting the content by means of the selected one or more analysis execution parts.

As referred to herein, the term "analysis execution parts," is a concept that includes a conversation content monitoring part, an interpreter and a translator which are to be described in the preferred embodiment of this invention.

According to a further aspect of this invention, a message processing method is provided for execution by a message processor which has a plurality of different interpreters and an interpreter control table for controlling a plurality of ontology specifying information which correspond to respective ones of the plurality of different interpreters. The method includes the steps of: receiving a message packet containing an ontology specifying information and a content, and determining whether or not an interpreter corresponding to the ontology specifying information contained in the message packet has been registered in the interpreter control table. The method further includes the steps of: determining whether or not the interpreter corresponding to the ontology specifying information is available in the message processor, when it is determined that the ontology specifying information contained in the message packet is not registered in the interpreter control table; registering in the interpreter control table the corresponding interpreter in correspondence to the ontology specifying information contained in the message packet, when it is determined that the interpreter corresponding to the ontology specifying information contained in the message packet is available in the message processor; and interpreting the content contained in the message packet by means of the corresponding interpreter.

According to a still further aspect of this invention, a message processing method is provided for execution by a message processor which has a plurality of different interpreters and an analysis execution part control table for controlling a plurality of different analysis execution parts in association with analysis execution part specifying information. The method includes the steps of:

receiving a message packet containing an analysis execution part specifying information and a content; and determining whether or not an analysis execution part corresponding to the analysis execution part specifying information contained in the message packet has been registered in the analysis execution part control table. The method further includes the steps of: determining whether or not the analysis execution part corresponding to the analysis execution part specifying information is available in the message processor, when it is determined that the analysis execution part specifying information contained in the message packet is not registered in the analysis execution part control table; and registering in the analysis execution part control table the corresponding analysis execution part in correspondence to the analysis execution part specifying information contained in the message packet, when it is determined that the analysis execution part corresponding to the analysis execution part specifying information contained in the message packet is available in the message processor.

According to a further aspect of this invention, a message processor is provided which has a plurality of different interpreters for processing a message received through a network. The processor includes an agent communication language manager for receiving a message packet containing ontology specifying information and a content. The processor also includes an interpreter loader for selecting one or more interpreters among the plurality of different interpreters among the plurality of different interpreters in conformance to the ontology specifying information contained in the message packet.

According to a still further aspect of this invention, a message processor is provided which has a plurality of different interpreters for processing a message received through a network. The processor includes an agent communication language manager for receiving a message packet containing an ontology specifying information, a describing language specifying information and a content specifying information. The processor further includes an interpreter loader for selecting one or more interpreters among the plurality of different interpreters in conformance to the ontology specifying information and describing language specifying information contained in said message packet.

According to a still further aspect of this invention, a message processor having a plurality of different analysis execution parts is provided which selects one or more analysis execution parts among the plurality of analysis execution parts in conformance to the ontology specifying information associated with the content to interpret the content by means of the selected one or more analysis execution parts.

According to a further aspect of this invention, a message processor is provided which has a plurality of different interpreters including an interpreter loader and an interpreter control table for controlling a plurality of ontology specifying information which correspond to respective ones of the plurality of different interpreters. The processor operates to determine whether or not an interpreter corresponding to the ontology specifying information contained in the message packet has been registered in the interpreter control table, the message packet containing an ontology specifying information and a content. The processor further determines whether or not the interpreter corresponding to the ontology specifying information is available in the message processor, when it is determined that the ontology specifying information contained in the message packet is not registered in the interpreter control table. Also, the processor registers in the interpreter control table the corresponding interpreter in correspondence to the ontology specifying information contained in the message packet, when it is determined that the interpreter corresponding to the ontology specifying information contained in the message packet is available in the message processor.

According to a still further aspect of this invention, a message processing method is provided for execution by a message processor which has a plurality of different interpreters including an interpreter loader and an analysis execution part control table for controlling a plurality of analysis execution parts in association with analysis execution part specifying information. The method includes the steps of: determining whether or not an analysis execution part corresponding to the analysis execution part specifying information contained in the message packet has been registered in the analysis execution part control table, the message packet containing an analysis execution part specifying information and a content; and determining whether or not the analysis execution part corresponding to the analysis execution part specifying information is available in the message processor, when it is determined that the analysis execution part specifying information contained in the message packet is not registered in the analysis execution part control table. The method further includes the step of registering in the analysis execution part control table the corresponding analysis execution part in correspondence to the analysis execution part specifying information contained in the message packet, when it is determined that the analysis execution part corresponding to the analysis execution part specifying information contained in the message packet is available in the message processor.

According to a further aspect of this invention, a message processor is provided which has a plurality of different interpreters for processing a message received through a network. The processor includes an agent communication language manager for receiving a message packet containing ontology specifying information, a describing language specifying information, a content specifying information and a response ID; and a conversation thread control part for analyzing a response ID contained in the message packet to form a conversation thread. The processor further includes a message log for recording the message packet; and an interpreter loader for selecting one or more interpreters among the plurality of different interpreters in conformance to the ontology specifying information and describing language specifying information contained in the message packet.

According to one of the aspects of this invention, a recording media is provided which stores therein a message processing program for execution by a message processor which has a plurality of different interpreters for processing a message received through the network. The media includes: a program code which instructs the message processor to receive a message packet containing an ontology specifying information and a content; and a program code which instructs the message processor to select one or more interpreters among the plurality of different interpreters in conformance to the ontology specifying information contained in the message packet. The media further includes a program code which instructs the message processor to interpret the content contained in the message packet by means of the selected one or more interpreters.

According to a further aspect of this invention, a media is provided which stores therein a message processing program for execution by a message processor which has a plurality of different interpreters for processing a message received through the network. The media includes: a program code which instructs the message processor to receive a message packet containing an ontology specifying information, a describing language specifying information and a content specifying information; and a program code which instructs the message processor to select one or more interpreters among the plurality of different interpreters in conformance to the ontology specifying information and describing language specifying information contained in the message packet. The media further includes a program code which instructs the message processor to interpret a content which corresponds to the content specifying information contained in the message packet by means of the selected one or more interpreters.

According to a still further aspect of this invention, a media is provided which stores therein a message processing program for execution by a message processor which has a plurality of different analysis execution parts. The media includes a program code which instructs the message processor to select one or more analysis execution parts among the plurality of different analysis execution parts in conformance to the ontology specifying information associated with the content. Also, the media includes a program code which instructs the message processor to interpret the content by means of the selected one or more analysis execution parts.

According to a further aspect of this invention, a media is provided which stores therein a message processing program for execution by a message processor which has a plurality of different interpreters and an interpreter control table for controlling a plurality of ontology specifying information which correspond to respective ones of the plurality of different interpreters. The media includes: a program code which instructs the message processor to receive a message packet containing an ontology specifying information and a content; a program code which instructs the message processor to determine whether or not an interpreter corresponding to the ontology specifying information contained in the message packet has been registered in the interpreter control table; and a program code which instructs the message processor to determine whether or not the interpreter corresponding to the ontology specifying information is available in the message processor, when it is determined that the ontology specifying information contained in the message packet is not registered in the interpreter control table. The media also includes: a program code which instructs the message processor to register in the interpreter control table the corresponding interpreter in correspondence to the ontology specifying information contained in the message packet, when it is determined that the interpreter corresponding to the ontology specifying information contained in the message packet is available in the message processor; and a program code which instructs the message processor to interpret the content contained in the message packet by means of corresponding interpreter.

According to a still further aspect of this invention, a medium is provided which stores therein a message processing program for execution by a message processor which has a plurality of different interpreters and an analysis execution part control table for controlling a plurality of different analysis execution parts in association with analysis execution part specifying information. The media includes a program code which instructs the message processor to receive a message packet containing an analysis execution part specifying information and a content. The media further includes a program code which instructs the message processor to determine whether or not an analysis execution part corresponding to the analysis execution part specifying information contained in the message packet has been registered in the analysis execution part control table. Additionally, the media includes a program code which instructs the message processor to determine whether or not the analysis execution part corresponding to the analysis execution part specifying information is available in the message processor, when it is determined that the analysis execution part specifying information contained in the message packet is not registered in the analysis execution part control table. Further, the media includes a program code which instructs the message processor to register in the analysis execution part control table the corresponding analysis execution part in correspondence to the analysis execution part specifying information contained in the message packet, when it is determined that the analysis execution part corresponding to the analysis execution part specifying information contained in the message packet is available in the message processor.

BRIEF DESCRIPTION OF THE DRAWINGS

The above set forth and other features of the invention are made more apparent in the ensuing Detailed Description of the Invention when read in conjunction with the attached Drawings, wherein:

FIG. 7 is a schematic diagram illustrating a conversation content monitoring part control table in a preferred embodiment of this invention;

FIG. 8 is a block diagram of one embodiment of processing components in the server (or client) site of this invention;

FIG. 10 is a schematic diagram illustrating an interpreter control table in a preferred embodiment of this invention;

FIG. 11 is a schematic diagram illustrating a translator control table in a preferred embodiment of this invention;

Identically labelled elements appearing in different ones of the above described figures refer to the same elements but may not be referenced in the description for all figures.

DETAILED DESCRIPTION OF THE INVENTION

Figure 1:
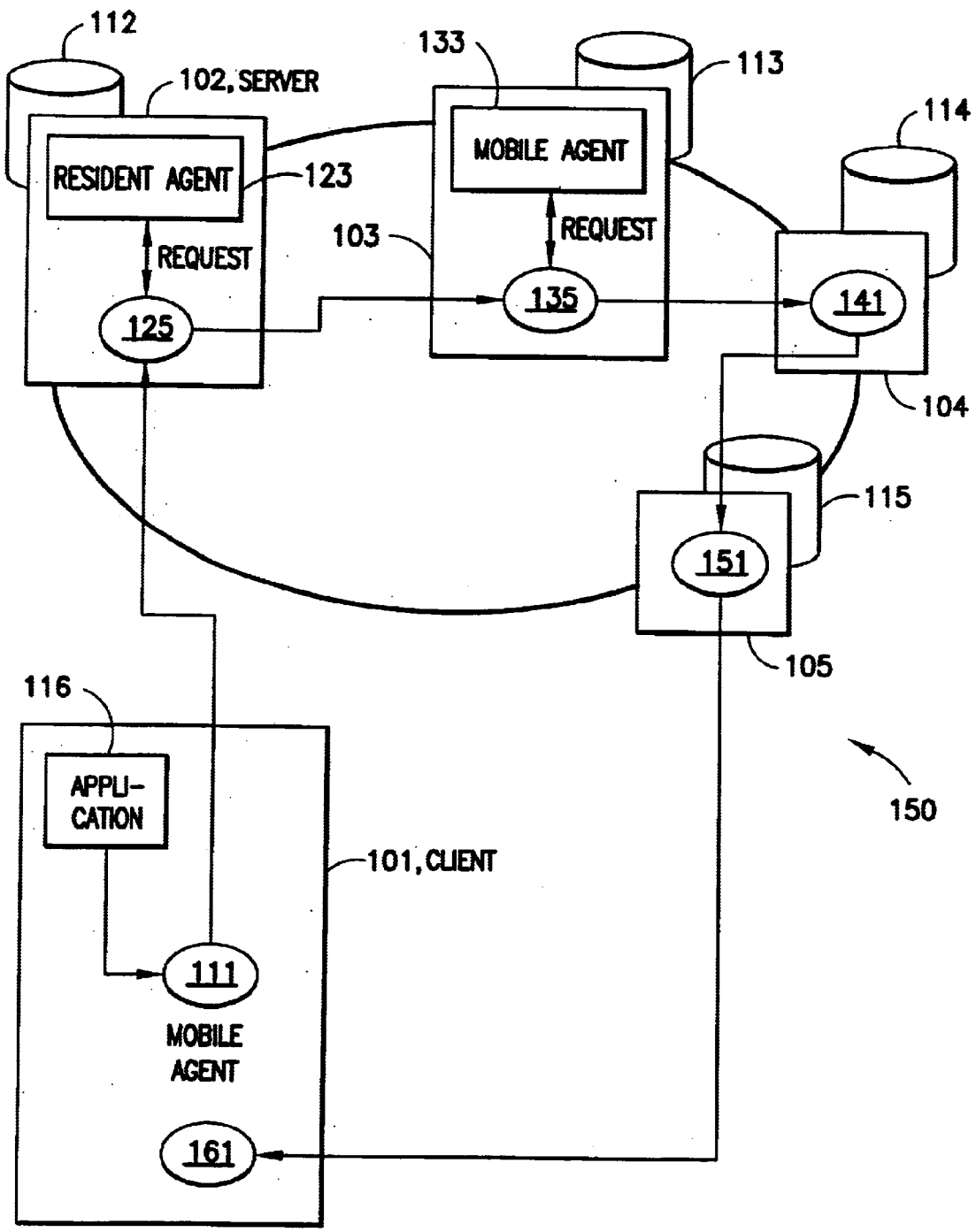
FIG. 1 shows a distributed network environment in which a mobile agent operates in accordance with the present invention.

The embodiment of this invention will now be described with reference to the drawings. With reference to FIG. 1, a distributed network environment 150 is shown which executes mobile objects of this invention. Each server 112–115 is provided with a place 102–105 for serving the mobile agents 125, 135, 141, etc. The group of places in the distributed network environment is referred to as a crowd.

An application 116 for forming and moving a mobile agent is in a client system 101. Mobile agents, such as agent 125 which are sent out by the application 116 may get in contact with other agents (mobile or resident agents) existing in each place 102–105 (an agent which gets in contact with a mobile agent to provide a service is referred to as an actor agent), send a request and receive the result of the request. A place provides a support to the contact between agents. Mobile agents, such as agent 125 may hold the result of the request received from the actor agent, continue to move, or send the result to the client 101 or other place during movement.

The mobile agent 125 (or a resident agent) may send a message packet to another place and execute a conversation and an instruction in such another place.

Figure 2:
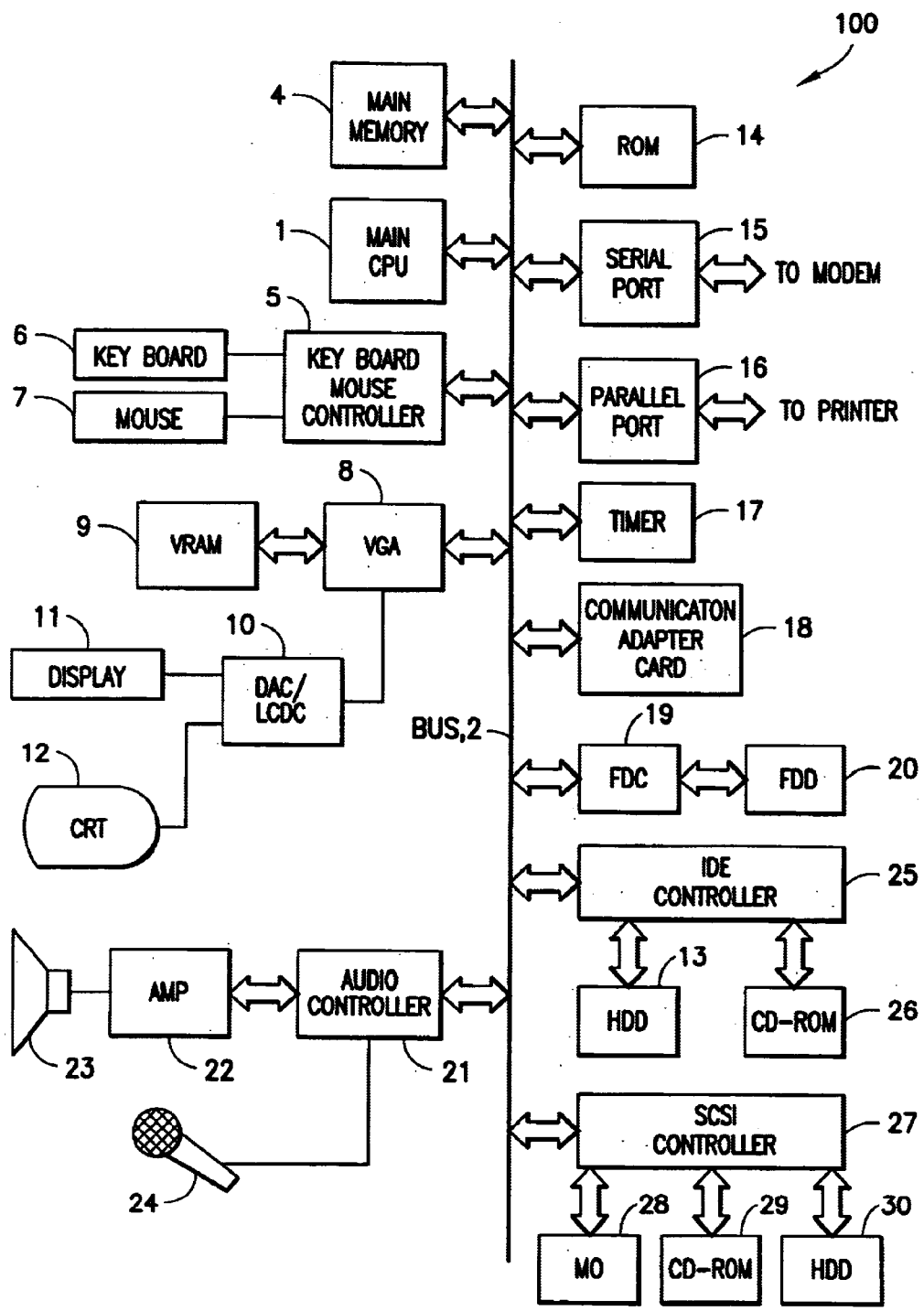
FIG. 2 is a block diagram showing one embodiment of the hardware configuration of the client system or the server system in accordance with the present invention.

FIG. 2 schematically shows a hardware configuration of each node (a server or a client site) existing on the distributed network environment 150 shown in FIG. 1. Each node 100 has a central processing unit (CPU) 1 and a memory 4. The CPU 1 and the memory 4 are connected, via a bus 2, to a hard disk drive (HDD) 13 acting as an auxiliary storage. Storage media drives including a floppy disk drive (FDD) 20, the hard disk drives 13 and 30, CD-ROM drives 26 and 29, and MO drive 28 are connected to the bus 2 through controllers including a floppy disk controller (FDC) 19, an IDE controller 25 and a small computer system interface (SCSI) controller 27.

A portable storage media such as a floppy disk is inserted to the storage media drive such as the floppy disk drive 20. Such floppy disk and other storage media of the hard disk drive 13 and a ROM 14 may have recorded therein a computer program which provides instructions to the CPU 1 in cooperation with an operating system to practice this invention, with the program being loaded into the memory 4. The computer software may be compressed or divided into multiple modules for storage in multiple media.

The node system 100 may be a system which has a user interface hardwired, such as a pointing device (e.g., a mouse 7 and a joy stick, etc.) or a keyboard 6 for input and a display 12 for presenting a visual data to a user. A parallel port 16 may be provided for connecting a printer. The node system 100 may have a modem connected thereto via a serial port 15 for connection to the network through the serial port 15 and the modem or through a token ring or a communication adapter 18 to communicate with other computer systems.

It will be readily understood that this invention may be implemented in a conventional personal computer (PC), a workstation, a general purpose computer or a combination of them. It should be noted however that these components are chosen as exemplary components and that not all of the components are necessarily an indispensable component of the invention. Specifically, it is not necessary to install a user interface in the server side because the server can be remote-controlled so that it is enough to have a basic data processing function such as a CPU and a memory, and a communication function. It is enough for the client side to have a configuration that is needed to send out a message packet (described later), including a communication function and an input means for designating a message packet and for transmitting the message packet.

The operating system in the client side and the server side may be implemented by one which supports on a standard basis a graphical user interface (GUI) multi-windows environment such as, for example, WindowsNT (trademark of Microsoft), Windows95 (trademark of Microsoft), Windows3.x (trademark of Microsoft), OS/2 (trademark of IBM), X-Window system (trademark of MIT) on AIX (trademark of IBM), and Solaris (trademark of Sun Micro Systems), as well as one which is for character base environment such as PC-DOS (trademark of IBM) and MS-DOS (trademark of Microsoft), and a real time operating system (OS) such as OS/Open (trademark of IBM) and VxWorks (trademark of Wind River Systems, Inc.) without being limited to any specific operating system environment.

An overview of an exemplary system configuration suitable for practicing the present invention will now be described.

Figure 3:
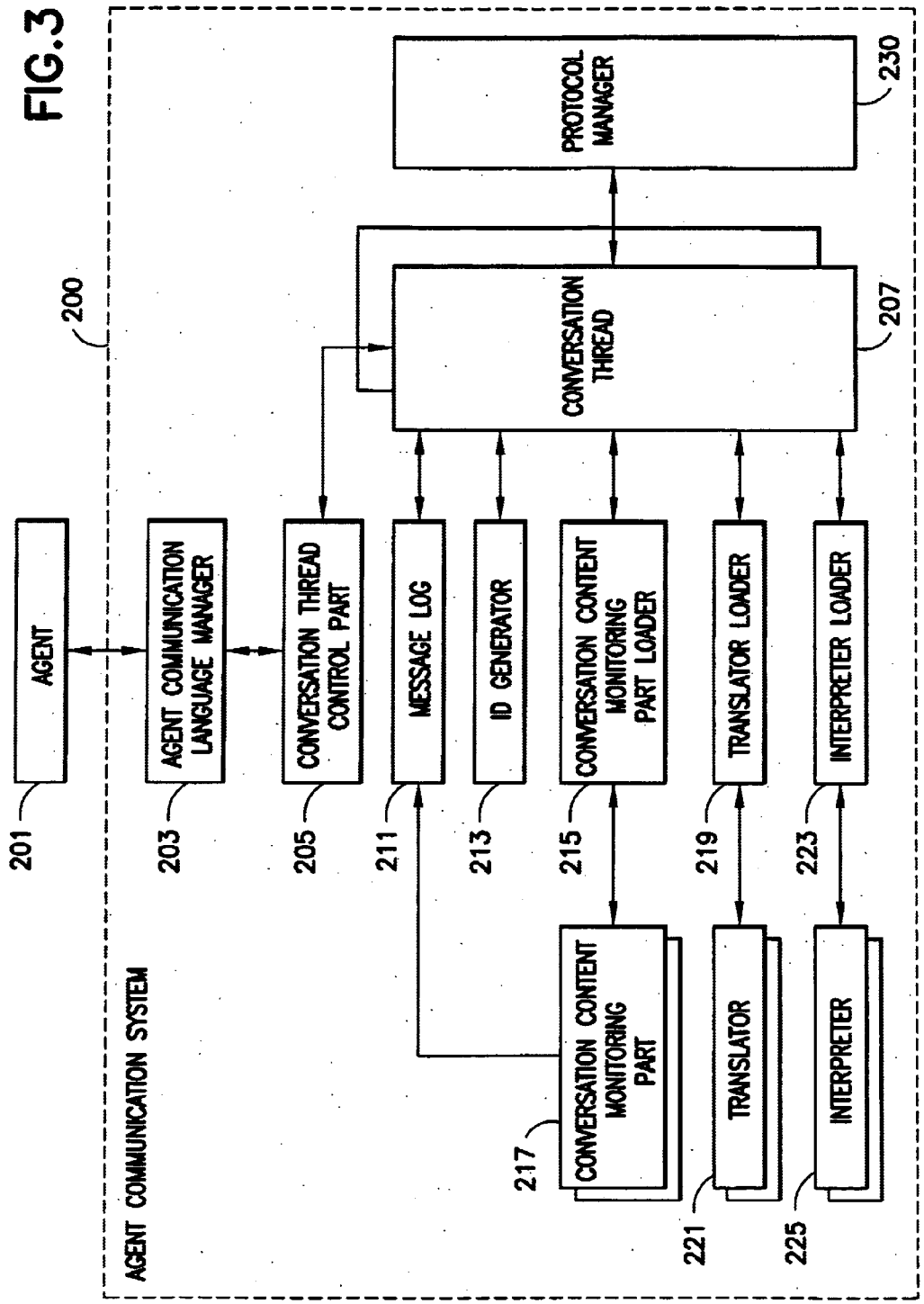
FIG. 3 is a block diagram of one embodiment of processing components in the client site or the server site of this invention.

With reference to the block diagram of FIG. 3, a system configuration of the server side in the preferred embodiment of this invention is described. An agent 201 is either a mobile agent which was sent to this server, or a resident agent which is resident in this server. The agent 201 may have a dialog with an agent communication system 200 by transmitting or receiving a message packet which will be described later.

An agent communication language manager 203 is a component of the agent communication system 200 for receiving a message sent from the agent 201 or the existing system and network. The agent communication language manager 203 also transmits messages to these systems.

A conversation thread control part 205 is a component of the agent communication system 200 for controlling a thread that corresponds to each conversation with an agent, for example agent 201. The conversation thread control part 205 forms a suitable thread in conformance to the flow of conversation, or gives control to the thread which has been generated. Multiple conversations are spit into multi-threads to accept multiple conversations asynchronously. The thread is hereinafter referred to as a conversation thread 207.

A message log 211 is another component of the agent communication system 200 for memorizing conversations. A conversation monitoring part 217 is also a component of the agent communication system 200 which conducts a policy check as to whether or not a conversation is valid from a conversation log stored in the message log 211 and a content of the current message. A conversation content monitoring part loader 215 is another component of the agent communication system 200 for calling the conversation monitoring part 217 which corresponds to the message type of the message packet 300.

The agent communication system 200 also includes a translator 221 for translating the agent communication language used in the conversation into another language. The agent communication system 200 further includes a translator loader 219 which controls the group of translators.

The agent communication system 200 also includes an interpreter 225 for understanding and executing the content of a conversation. A plurality of different such interpreters are provided corresponding to ontologies and describing languages which will be described later. Each interpreter has a format check routine, a content interpretation routine and an execution routine specific to an ontology. For example, an ontology of traffic reservation assumes that a content "R, flight, Narita to Tacoma, 1997/07/06/15:00–1997/07/06/18:00," is received. After a check for a predetermined format, a specific content interpretation routine is executed. The content interpretation routine interprets that "R," is a command which invokes a process to make a reservation by accessing a database in a given airline to execute an execution routine for checking the reservation status. Finally, a reservation is made for a non-smoking seat, economy, FlightXX26 for Tacoma, Seattle, departing Narita air port at 17:10 on Jul. 6, 1997 and the reservation is confirmed to the sender.

An interpreter loader 223 is also a component of the agent communication system 200 for controlling the group of interpreters 225. A protocol manager 230 is a component for converting to a protocol which conforms to the type of network to be connected.

Each of the functional blocks in FIG. 3 has been described. These functional blocks, or components, are logical functional blocks and are not meant to be implemented as an independent integral hardware or software, but may be implemented as a complex of hardwares and softwares or common hardwares and softwares. Further, not all of the functional blocks in FIG. 3 are necessarily a component which is indispensable to this invention.

For example, it would be enough to install either one of the conversation content monitoring part loader 215, the translator loader 219 and the interpreter loader 223, to dynamically switch among the conversation content monitoring part 217, the translator 221 and the interpreter 225 for indicating the interpretation execution part to the used. The agent communication language manager 203, the conversation thread control part 205, the conversation thread 207, the message log 211, the ID generator 213, the conversation content monitoring part 217, the translator 221 and the interpreter 225 are not a component indispensable to one aspect of this invention.

An overview of an exemplary operational process suitable for practicing the present invention will now be described.

Figure 4:
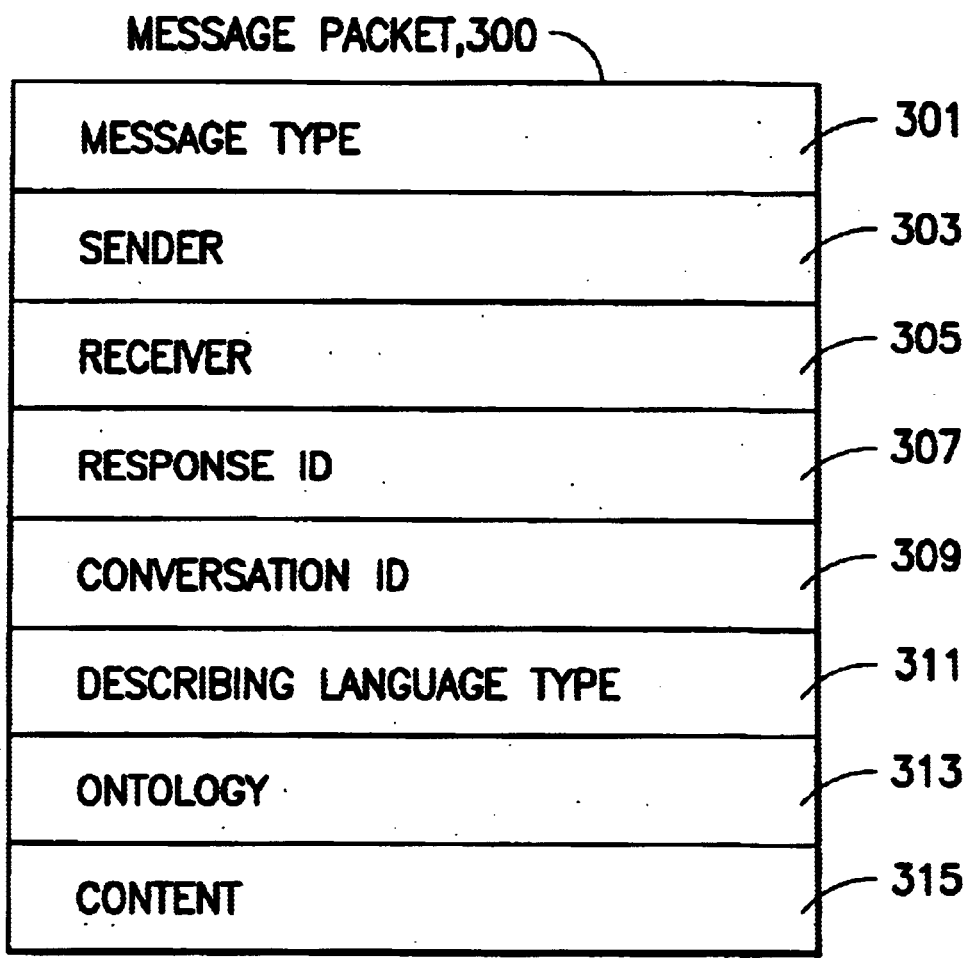
FIG. 4 is a schematic diagram of a message packet of this invention.
Figure 5:
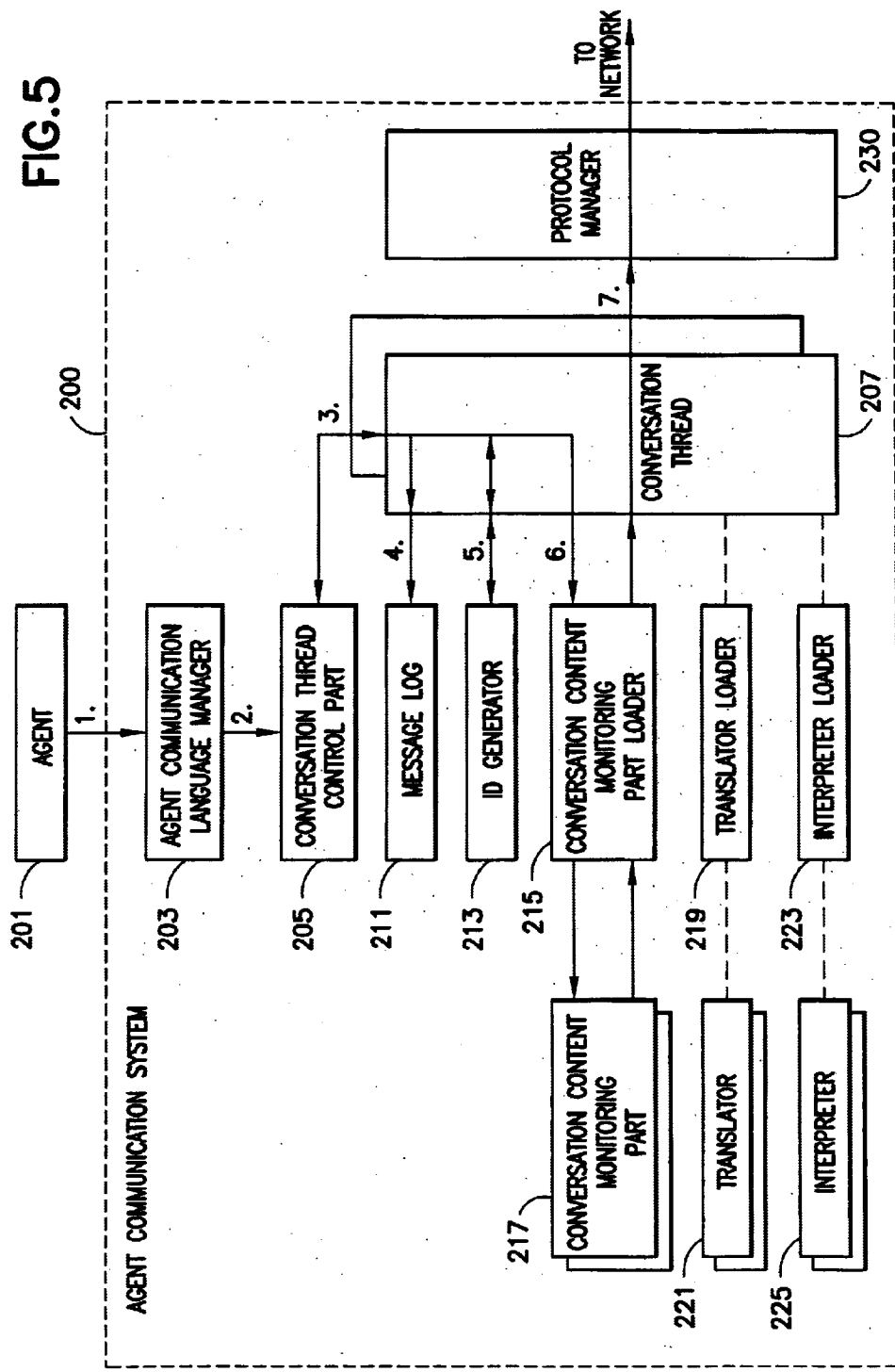
FIG. 5 is a block diagram of one embodiment of processing components in the client (or server) site of this invention.

FIG. 4 shows schematically a message packet 300 as used in a preferred embodiment of this invention. FIG. 5 shows an operational condition of each component in FIG. 3 when a message is generated.

In a message type 301 contained in the message packet 300 in FIG. 4, a performative of the agent communication language (ACL) is used in the preferred embodiment of this invention. The ACL is a high-level language which provides a communication among agents in a form that is representative of the human language, and includes, for example ACLs provided by FIPA (Foundation for Intelligent Physical Agents), ACL, KQML (Knowledge Query Manipulation Language), and KIF (knowledge Interchange Format. A description of the KQML may be found in "SEMANTICS FOR AN AGENT COMMUNICATION LANGUAGE", by Yannis Labrou, a Doctoral Dissertation for a PhD Defense Examination, submitted to Defense Committee at the Computer Science and Electrical Engineering Department (CSEE) of the University of Maryland Graduate School and "TR CS-97-03, A Proposal for a new KQML Specification", by Yannis Labrou and Tim Finin, Feb. 3, 1997. Included in the performative of KQML which is one of the ACLs are;

ask-if, ask-all, stream-all, eos, tell, untell, deny, insert, uninsert, delete-one, delete-all, undelete, achieve, unachieve, advertise, unadvertise, subscribe, error, sorry, standby, ready, next, rest, discard, register, unregister, forward, broadcast, transport-address, broker-one, broker-all, recommend-one, recommend-all, recruit-one, recruit-all.

The message packet 300 of FIG. 4 further includes a sender 303 which is a sender of a message, and a receiver 305 which is a receiver of a message. A response ID 307 is an ID which follows a preceding conversation. When an agent has a conversation with a plurality of parties, a plurality of response ID's 307 are allocated corresponding to the conversation threads which will be described later. A conversation ID 309 is an ID which tells the conversation partner to respond with this ID. The describing language type 311 is information which specifies the language describing the content. The ontology 313 is information which specifies the ontology that the content specifies.

The content 315 is the particular content of a message, i.e. the subject or topic covered by the message, and includes a software for forming instructions after it moved to another place in the preferred embodiment of this invention. The content 315 may also internally contain a message packet for movement to another place via a relaying point. The content may also include a "from," entry and a "to," entry which indicate a true sender and a final receiver, respectively, in the preferred embodiment of this invention.

An operational condition of each component in FIG. 3 during message generation will now be described with reference to FIG. 5. The agent 201 sends a message packet 300, shown in FIG. 4, to the agent communication system 200.

In the preferred embodiment of this invention, the components shown in FIG. 3 are defined as a class of an object orientated programming language. As hereinafter referred to, a class is a set of objects within the object oriented programming language methodology that contain the same types of values and the same methods. Similarly, a method refers to procedures within an object that operate to, for example, send messages to other objects.

Figure 6:
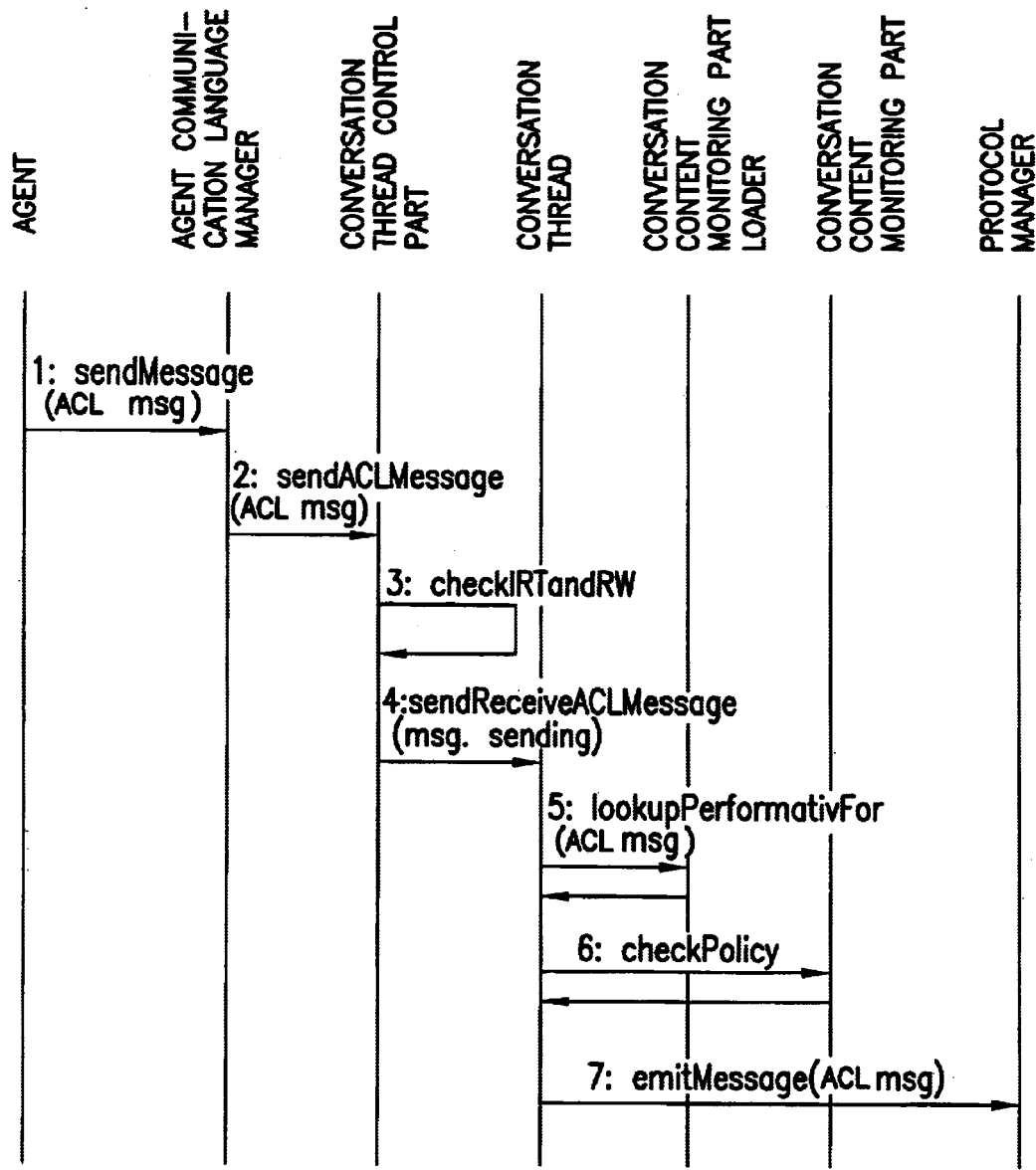
FIG. 6 is an object interaction diagram among the components in a preferred embodiment of this invention.

Each object, upon generating a message, prompts other objects to operate by sending an instruction to such other objects as shown in the object instruction diagram among components in FIG. 6. The agent communication language manager 203, upon receiving the message packet 300, conducts a message generation process when it is called with a "sendMessage" method, while it conducts a receive message process when it is called with a "handleMessage," method.

The conversation thread control part 205 determines with reference to the response ID 307 which is contained in the message packet 300 whether or not to ask an already generated conversation thread to process. If the conversation thread control part 205 determines that it is a new conversation, it generates a new conversation thread 207, instructs the ID generator 213 via the conversation thread 207 to allocate a new conversation ID 309 and moves the control to the conversation thread 207. In the preferred embodiment of this invention, the conversation ID 307 is allocated with an ID which is uniquely identified on the network, such as "URL+Date+Time+Serial Number".

If a conversation thread 207 corresponding to the response ID 307 has existed, the conversation thread control part 205 determines that this is not a new conversation and moves the control to the corresponding conversation thread 207. If it is desired to continue the conversation, the conversation thread 207 instructs the ID generator 213 to allocate conversation ID 309. The message log 211 then memorizes the message packet 300 which is sent to the conversation thread 207.

The conversation content monitoring part loader 215 calls a conversation content monitoring part 217 corresponding to the message type 301 of the message packet 300. The conversation content monitoring part 217 corresponding to the message type 301 may be called by providing a conversation content monitoring part table 330 as shown in FIG. 7, or by using a class name of the conversation content monitoring part 217 which is the same as the message type 301.

The conversation content monitoring part 217 conducts a policy check as to whether or not a conversation could be valid based on the conversation log stored in the message log 211 and the content of the current message. For example, if the message type 301 of the received message packet 300 is "sorry" (a message type which means that the content of the conversation is understandable but the receiving party does not have a capability to process), a reference is made to the message log 211 for a message type 301 of the message which has a corresponding response ID 307 and an immediately preceding ID. It is then determined that the message type 301 can be processed if it is of a type which is valid as a conversation, for example an "ask-if," (a message type 301 which queries about the processing capability of the other party). However, if the message type 301 is determined to be of a message type 301 which can not be valid as a conversation like, for example, "deny" (a message type 301 which means denial), then an action is taken such as, for example, sending a message packet 300 of "error," (a message type 301 which means an error) to the sender 303 of the message packet 300.

If it is determined that a conversation is valid, a message packet 300 is sent from the conversation thread 207 to a node which is designated as a receiver 305 through the protocol manager 230. The protocol manager 230 converts the protocol to one which conforms to the type of the network to be connected. Therefore, the agent communication system 200 can send and receive a message packet 300 without being aware of the network protocol.

Figure 9:
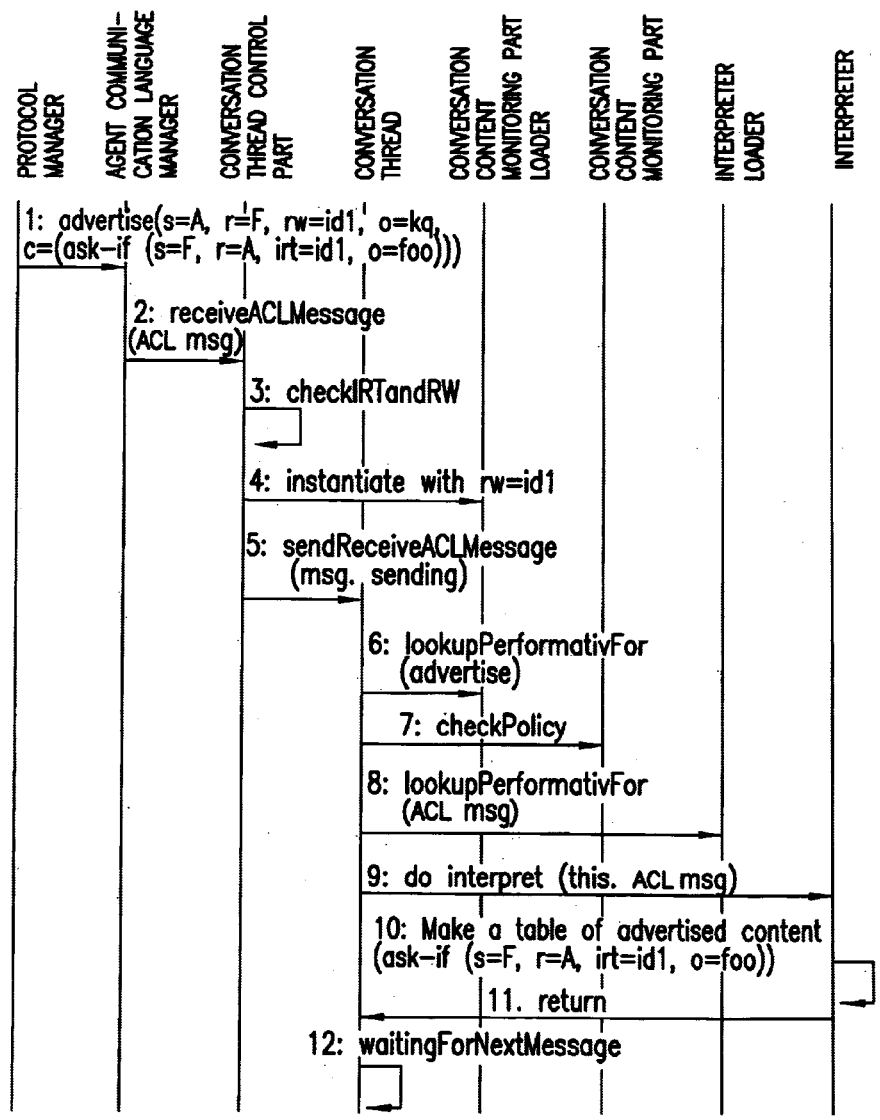
FIG. 9 is an object interaction diagram among the components in a preferred embodiment of this invention.

Now with reference to FIG. 8 and FIG. 9, the operational condition of each component, at the node which received the message packet 300 so sent, is discussed.

The agent communication language manager 203 which has received a message packet 300 from the protocol manager 230 determines that the received message packet 300 is one for receiving the message as it is passed by the "handleMessage," method. The agent communication language manager 203 instructs the conversation thread control part 205 to process, or handle, the message. In the preferred embodiment of this invention, the protocol manager 230 knows of the existence of the agent communication language manager 203 as the latter internally instantiates, it can send the incoming data to the agent communication language manager 203.

The conversation thread control part 205 determines whether or not to ask the conversation thread 207 to process the message packet 300 with reference to the response ID 307 contained in the message packet 300. If the conversation thread control part 205 determines that the packet is a new conversation, it generates a new conversation thread 207 and transfers it to the conversation thread 207 for processing.

If a conversation thread 207 corresponding to the response ID 307 exists, the conversation thread control part 205 determines that the message packet 300 is not a new conversation and transfers the message packet 300 to the corresponding conversation thread 207 for processing. The message log 211 then memorizes the message packet 300 which is sent to the conversation thread 207 for processing. The conversation content monitoring part loader 215 calls a conversation content monitoring part 217 which conforms to the message type 301 of the message packet 300. The conversation content monitoring part 217 conducts a policy check as to whether or not a conversation is valid based upon the conversation log stored in the message log 211 and the content 315 of the current message packet 300.

If it is determined that a conversation is valid, the conversation thread 207 transfers control to the interpreter loader 223 for processing. The interpreter loader 223 understands the agent communication language of the message packet 300 and determines whether or not the describing language type 311 contained in the message packet 300 and an interpreter which corresponds to the ontology 313 are stored in an interpreter control table 350 shown in FIG. 10.

If an interpreter which corresponds to the agent communication language, describing language type 311 and the ontology 313 of the received message packet 300 is stored in the interpreter control table 350, then the content 315 is interpreted by that interpreter. If an interpreter which corresponds to the agent communication language, describing language type 311 and the ontology 313 of the received message packet 300 is not stored in the interpreter control table 350, then a determination is made as to whether or not an interpreter which corresponds to that combination exists in an interpreter library which is managed (accessible) by the system. It can be appreciated that the interpreter library includes available interpreters that are suitable to operate in accordance with the present invention.

If the interpreter exists, it is registered in the interpreter control table 350 and the content 315 is interpreted using that interpreter. If an interpreter which corresponds to a combination of the agent communication language, describing language type 311 and the ontology 313 does not exist in the interpreter library, then a determination is made as to whether or not an interpreter which corresponds to a combination of the describing language type 311 and the ontology 313 exists in the interpreter library. If it does not exist, it is determined that the message packet 300 can not be processed. In the preferred embodiment of this invention, the ontologies are hierarchically structured so that an interpreter of a best matching ontology can be used.

It an interpreter and a translator exists that can translate the language of the content to the language that the interpreter can interpret, control is transferred to the translator loader 219 to translate the content 315 into the agent communication language of the discovered interpreter. The translator loader 219 makes a reference to the translator control table 340 and determines whether or not there exists a translator which can execute the requested translation. In the preferred embodiment of this invention, if the translator does not exist, a translator library is searched in a similar way as the interpreter library was searched. If a translator is selected from the translator-library, then an entry is made to the translator control table 340 and the translated content 315 is processed by the selected interpreter. If the translator does not exist in the translator library, then it is determined that the message packet 300 can not be processed. As with the interpreter library, it can be appreciated that the translator library includes available translators that are suited to operate in accordance with the present invention.

In the preferred embodiment of this invention, the result of the interpretation by the interpreter 225 is transmitted to the agent 231 where it is processed according to the content of instructions which are described in the content 315. Depending on what is in the content 315, either the conversation thread 207 is destroyed, a process is started to begin a new conversation, or a new agent is generated. In the preferred embodiment of this invention, the interpreter 225 returns control to the conversation thread 207. The conversation thread 207 will standby until another message packet 300 is received.

In the preferred embodiment of this invention so far described, the interpretation execution parts are registered in the control tables at the time of execution. However, the interpretation execution parts need not be registered at the time of execution. Instead, a check may be made at the time of execution to start the agent communication system 200 as to what interpretation execution parts exist to form and maintain an interpretation execution part control table.

While the message packet 300 moves among nodes in the preferred embodiment of this invention, the message packet 300 may be sent in an attachment to a mobile agent. In such case, the mobile agent 233 moves around places and holds conversation with the message packet 300 attached thereto. It is further possible to carry out complex jobs such as having a conversation at another place using the process result.

Figure 12:
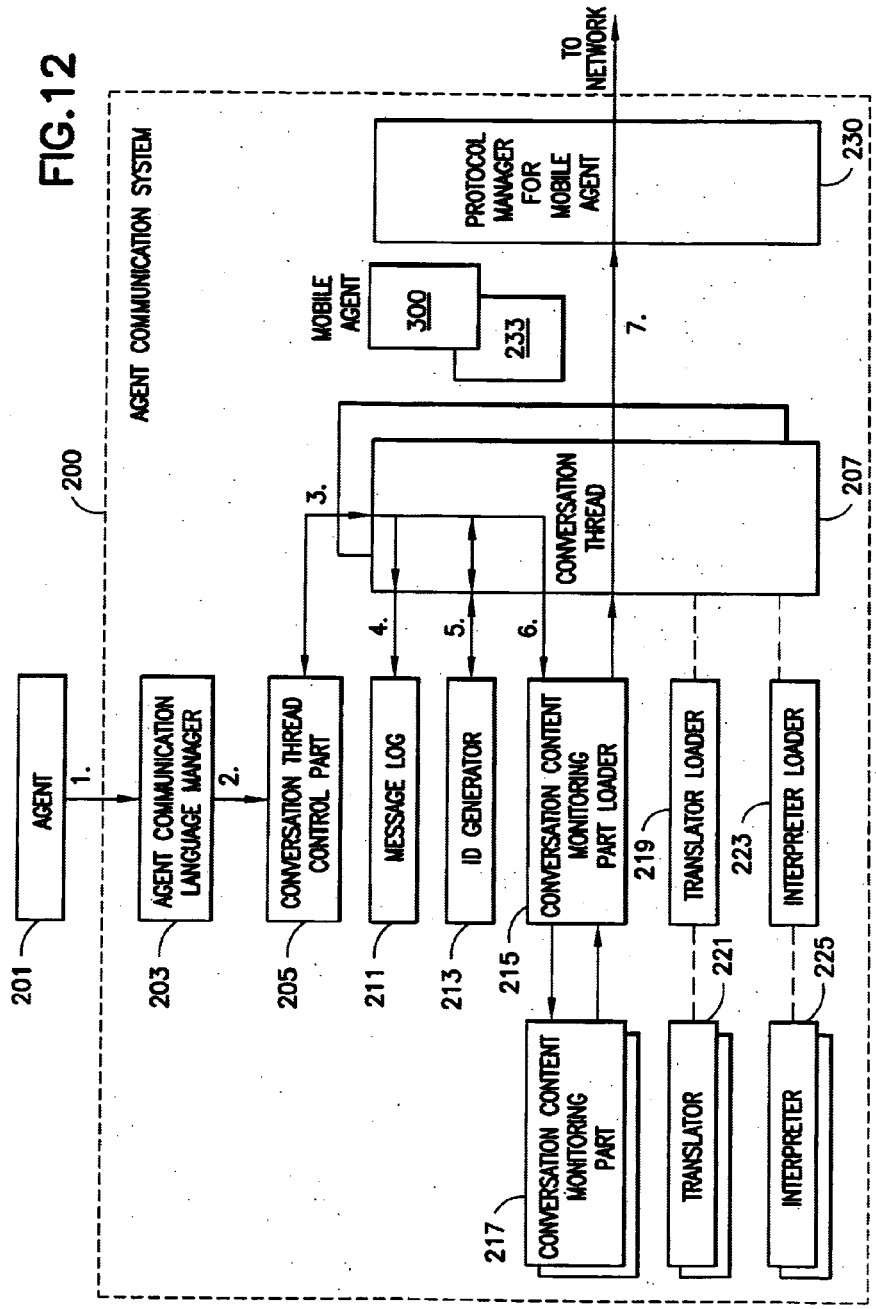
FIG. 12 is a block diagram of one embodiment of processing components in the client (or server) site of this invention.
Figure 13:
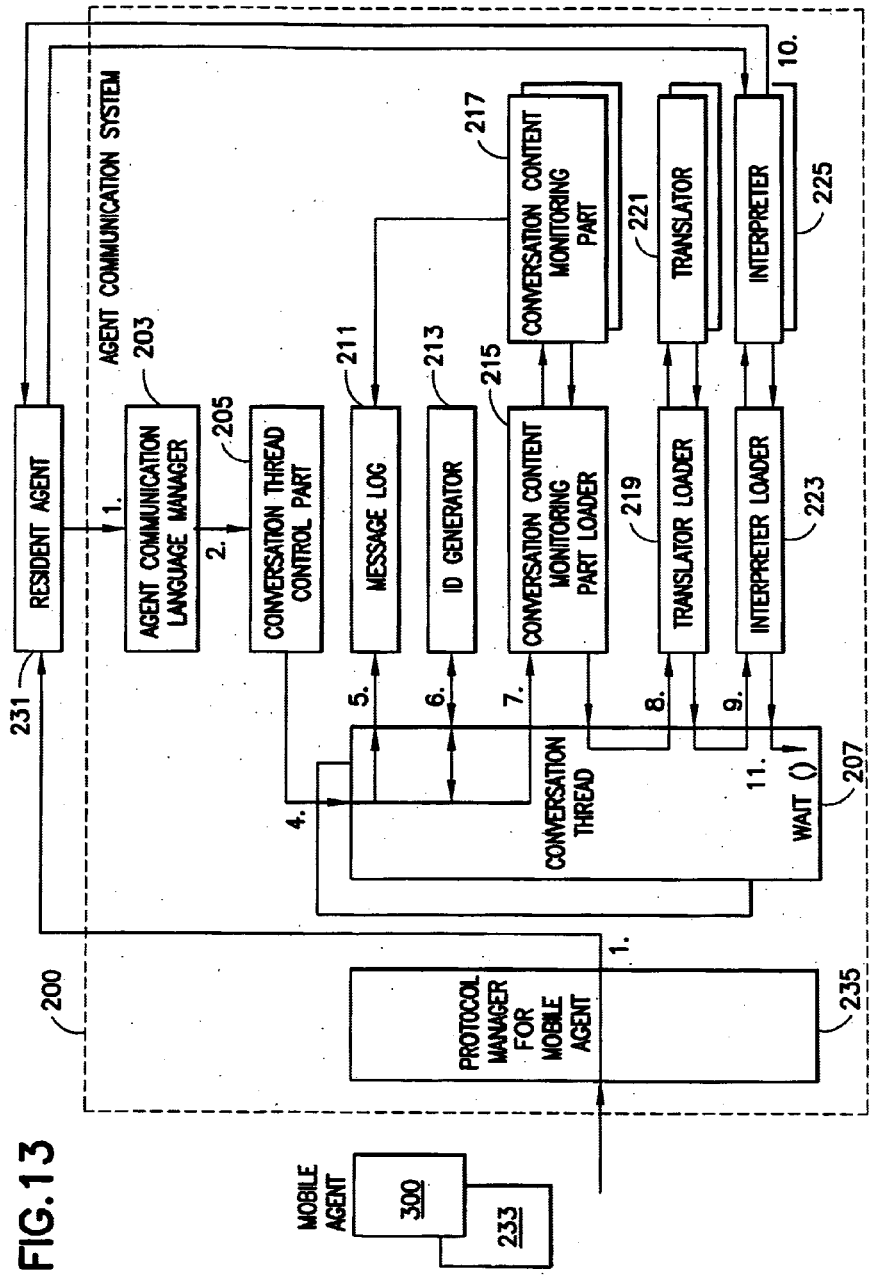
FIG. 13 is a block diagram of one embodiment of processing components in the server (or client) site of this invention.
Figure 14:
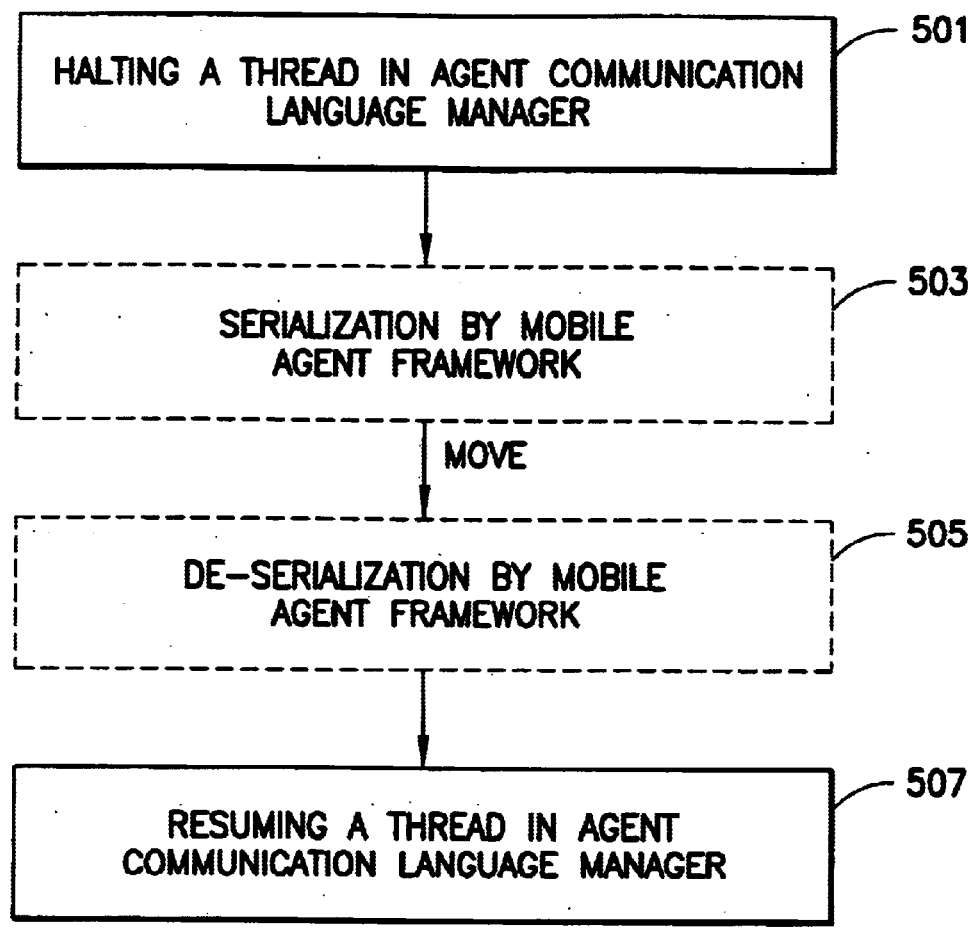
FIG. 14 is a flow chart showing an embodiment of processing steps taken when the agent communication system of this invention is moved over the network.

Movement of a mobile agent over the network is effected by executing the steps shown in FIGS. 12–14 wherein operational conditions of each component of one embodiment of this invention (as shown in FIG. 3) are illustrated.

As described above, this invention provides a communication system which is capable of giving a suitable response by using an interpretation execution part which conforms to the content (defined with background concept and vocabulary) of the conversations among agents.

In one of the aspects of this invention, a message processing system is provided which enables a high speed processing by reducing unnecessary decision logic.

In another aspect of this invention, a message processing system is provided in which resources required for execution are decreased.

In still another aspect of this invention, a message processing system is provided which realizes high-speed parallel conversation processing.

In a further aspect of this invention, the work and the time required for developing and maintaining a program are decreased as much as possible in providing a support to communication among agents.

In a further aspect of this invention, a message processing system is provided which is capable of flexibly dealing with conversations among agents.

In a still further aspect of this invention, a message process system is provided which gives less load to a communication network.

Although described in the context of preferred embodiments, it should be realized that a number of modifications to these teachings may occur to one skilled in the art. By example, and as discussed above, the teachings of this invention are not intended to be limited to any specific network configuration or protocol.

While the invention has been particularly shown and described with respect to preferred embodiments thereof, it will. be understood by those skilled in the art that changes in form and details may be made therein without departing from the scope and spirit of the invention.

What is claimed is:

1. A message processing method for execution by a message processor having a plurality of different interpreters for processing a message received through a network, said method comprising the steps of:

receiving a message packet transmitted from an agent, said message packet containing ontology specifying information, a message type, a response ID and content specifying information;

selecting one or more interpreters of the plurality of different interpreters in conformance to the ontology specifying information contained in said message packet;

interpreting the content corresponding to the content specifying information contained in said message packet by means of the selected one or more interpreters;

registering said message packet in a message log;

calling a conversation monitoring part corresponding to the message type;

at the conversation monitoring part, conducting a policy check as to whether or not a conversation is valid by referring to the message type of an immediately preceding message packet having the response ID in the message log;

if it is determined that the conversation is not valid, sending an error message packet to the sender of said message packet.

2. A message processing method as set forth in claim 1, wherein the received message packet further contains describing language specifying information and content specifying information, wherein the step of selecting further comprises:

selecting the one or more interpreters in conformance to the ontology specifying information and the describing language specifying information contained in the message packet;

and wherein the step of interpreting further comprises:

interpreting the content which corresponds to the content specifying information contained in the message packet.

3. A message processing method for execution by a message processor having a plurality of different interpreters and an interpreter control table for controlling a plurality of ontology specifying information which corresponds to respective ones of said plurality of different interpreters, said method comprising the steps of:

receiving a message packet, transmitted from a mobile agent, containing ontology specifying information and a content;

determining whether an interpreter corresponding to the ontology specifying information contained in said message packet has been registered in said interpreter control table;

determining, if no corresponding interpreter has been registered, whether an interpreter corresponding to the ontology specifying information contained in said message packet is available in said message processor;

registering, if an interpreter corresponding to the ontology specifying information contained in said message packets is available in said message processor, said corresponding interpreter in said interpreter control table;

interpreting the content contained in said message packet by means of said corresponding interpreter; and determining if response identification in a message packet is for a new conversation, and if so generating and new conversation thread, and if for an existing conversation moving control to a corresponding conversation thread.

4. A message processing method for execution by a message processor having a plurality of different interpreters, a plurality of different analysis execution parts, and an analysis execution part control table for controlling the plurality of different analysis execution parts in association with analysis execution part specifying information, said method comprising the steps of:

receiving a message packet transmitted from a mobile agent and containing analysis execution part specifying information and a content;

determining whether the analysis execution part corresponding to the analysis execution part specifying information contained in the received message packet has been registered in the analysis execution part control table;

if it is determined that said analysis execution part corresponding to the analysis execution part specifying information has not been so registered, determining whether it is available in the message processor;

if it is determined that said analysis execution part is available in the message processor, registering said analysis execution part in the analysis execution part control table; and determining if response identification in a message packet is for a new conversation, and if so generating and new conversation thread, and if for an existing conversation moving control to a corresponding conversation thread.

5. A message processor having a plurality of different interpreters for processing a message received through a network, said processor comprising:

an agent communication language manager for receiving a message packet, transmitted from a mobile agent, containing ontology specifying information, which corresponds to one or more of said plurality of different interpreters, and a content;

an interpreter loader for selecting one or more interpreters of said plurality of different interpreters in conformance to said ontology specifying information contained in said message packet; and means for determining if response identification in a message packet is for a new conversation, and if so generating and new conversation thread, and if for an existing conversation moving control to a corresponding conversation thread.

6. A message processor as set forth in claim 5, wherein said message packet further contains describing language specifying information and content specifying information, and wherein said interpreter loader selects said one or more interpreters in conformance to said ontology specifying information and said describing language specifying information contained in said message packet.

7. A message processor as set forth in claim 5, wherein said message packet further contains describing language specifying information, content specifying information and a response ID, and further comprising:

a conversation thread control part for analyzing said response ID contained in said message packet to form a conversation thread;

a message log for recording said message packet; and wherein said interpreter loader further selects said one or more interpreters in conformance to said ontology specifying information and said describing language specifying information contained in said message packet.

8. A message processor, having a plurality of different analysis execution parts, for processing a message received through a network, said message processor comprising:

means for selecting one or more analysis execution parts of said plurality of different analysis execution parts in conformance to ontology specifying information associated with a content contained in a message packet transmitted from a mobile agent;

means for interpreting said content with said selected one or more analysis execution parts; and means for determining if response identification in a message packet is for a new conversation, and if so generating and new conversation thread, and if for an existing conversation moving control to a corresponding conversation thread.

9. A message processor, for processing message packets, transmitted from a mobile agent, containing ontology specifying information and content specifying information, comprising:

a plurality of different interpreters;

an interpreter control table for controlling a plurality of ontology specifying information which corresponds to respective ones of said plurality of different interpreters;

means for determining whether an interpreter, corresponding to ontology specifying information contained in a message packet received from said mobile agent, has been registered in said interpreter control table;

means, when it is determined that said ontology specifying information contained in said message packet is not registered in said interpreter control table, for determining whether said interpreter, corresponding to said ontology specifying information, is available in said message processor;

means for registering in said interpreter control table said corresponding interpreter in correspondence to said ontology specifying information contained in said message packet, when it is determined by said means for determining that said interpreter corresponding to said ontology specifying information contained in said message packet is available in said message processor; and means for determining if response identification in a message packet is for a new conversation, and if so generating and new conversation thread, and if for an existing conversation moving control to a corresponding conversation thread.

10. A message processor for processing message packets, transmitted from a mobile agent, containing analysis execution part specifying information and a content, comprising:

a plurality of different interpreters;

a plurality of analysis execution parts;

an analysis execution part control table for controlling said plurality of analysis execution parts in association with analysis execution part specifying information;

means for determining whether an analysis execution part corresponding to an analysis execution part specifying information contained in a message packet received from said mobile agent has been registered in said analysis execution part control table;

means, when it is determined that said analysis execution part specifying information contained in said message packet is not registered in said analysis execution part control table, for determining whether said analysis execution part, corresponding to said analysis execution part specifying information, is available in said message processor;

means for registering in said analysis execution part control table said corresponding analysis part in correspondence to said analysis execution part specifying information contained in said message packet, when it is determined that said analysis execution part corresponding to said analysis execution part specifying information contained in said message packet is available in said message processor; and means for determining if response identification in a message packet is for a new conversation, and if so generating and new conversation thread, and if for an existing conversation moving control to a corresponding conversation thread.

11. A message processor as set forth in claim 10, wherein said message processor further comprises:

an interpreter control table for controlling a plurality of ontology specifying information which corresond to respective ones of said plurality of different interpreters;

means receiving said message packet, wherein said message packet further contains ontology specifying information and said content;

means for determining whether an interpreter corresponding to said ontology specifying information has been registered in said interpreter control table;

means, when it is determined that said ontology specifying information contained in said message packet is not registered in said interpreter control table, for determining whether said interpreter, corresponding to said ontology specifying information, is available in said message processor;

means for registering in said interpreter control table said corresponding interpreter in correspondence to said ontology specifying information contained in said message packet, said means for registering being operative when it is determined that said interpreter corresponding to said ontology specifying information contained in said message packet is available in said message processor; and means for interpreting said content contained in said message packet by means of said corresponding interpreter.

12. A recording media which stores therein a message processing program for execution by a message processor having a plurality of different interpreters for processing a message received through a network, said message processing program comprising:

a first program code which instructs said message processor to receive a message packet, transmitted from a mobile agent, containing an ontology specifying information and a content;

a second program code which instructs said message processor to select one or more interpreters of said plurality of different interpreters in conformance to said ontology specifying information contained in said message packet;

a third program code which instructs said message processor to interpret said content contained in said message packet by means of said selected one or more interpreters; and determining if response identification in a message packet is for a new conversation, and if so generating and new conversation thread, and if for an existing conversation moving control to a corresponding conversation thread.

13. A recording media as set forth in claim 12, wherein said received message packet further contains a describing language specifying information and a content specifying information, and said second program code further instructs said message processor to select said one or more interpreters of said plurality of different interpreters in conformance to said ontology specifying information and said describing language specifying information contained in said message packet, and said third program code further instructs said message processor to interpret a content which corresponds to said content specifying information contained in said message packet by means of said selected one or more interpreters.

14. A recording media as set forth in claim 12, wherein said message processor further comprises an interpreter control table for controlling a plurality of ontology specifying information which correspond to respective ones of said plurality of different interpreters and said message processing program further comprises:

a fourth program code which instructs said message processor to determine whether an interpreter corresponding to said ontology specifying information contained in said message packet has been registered in said interpreter control table;

a fifth program code which, when it is determined that said ontology specifying information contained in said message packet is not registered in said interpreter control table, instructs said message processor to determine whether said interpreter corresponding to said ontology specifying information is available in said message processor;

a sixth program code which, when it is determined that said interpreter corresponding to said ontology specifying information contained in said message packet is available in said message processor, instructs said message processor to register in said interpreter control table said corresponding interpreter in correspondence to said ontology specifying information contained in said message packet; and wherein said sixth program code further instructs said message processor to interpret said content contained in said message packet by means of said corresponding interpreter.

15. A recording media which stores therein a message processing program for execution by a message processor having a plurality of different analysis execution parts, said message processing program comprising:

first program code which instructs said message processor to select one or more analysis execution parts of said plurality of different analysis execution parts in conformance to ontology specifying information associated with a content in a received message packet, transmitted from a mobile agent, containing ontology specifying information and a content;

second program code which instructs said message processor to interpret said content by means of said selected one or more analysis execution parts; and determining if response identification in a message packet is for a new conversation, and if so generating and new conversation thread, and if for an existing conversation moving control to a corresponding conversation thread.

16. A recording media as set forth in claim 15, wherein said message processor further comprises a plurality of different interpreters and an analysis execution part control table for controlling said plurality of different analysis execution parts in association with an analysis execution part specifying information, and said message processing program further comprises:

a third program code which instructs said message processor to receive a message packet containing said analysis execution part specifying information and said content;

a fourth program code which instructs said message processor to determine whether said analysis execution part corresponding to said analysis execution part specifying information contained in said message packet has been registered in said analysis execution part control table;

a fifth program code which, when it is determined that said analysis execution part specifying information contained in said message packet is not registered in said analysis execution part control table, instructs said message processor to determine whether said analysis execution part corresponding to said analysis execution part specifying information is available in said message processor; and a sixth program code which, when it is determined that said analysis execution part corresponding to said analysis execution part specifying information contained in said message packet is available in said message processor, instructs said message processor to register in said analysis execution part control table said corresponding analysis execution part in correspondence to said analysis execution part specifying information contained in said message packet.

17. A program product that carries out a message processing method for execution by a message processor having a plurality of different interpreters for processing a message received through a network, said method comprising the steps of:

receiving a message packet transmitted from an agent, said message packet containing ontology specifying information, a message type, a response ID and content specifying information;

selecting one or more interpreters of the plurality of different interpreters in conformance to the ontology specifying information contained in said message packet;

interpreting the content corresponding to the content specifying information contained in said message packet by means of the selected one or more interpreters;

registering said message packet in a message log;

calling a conversation monitoring part corresponding to the message type;

at the conversation monitoring part, conducing a policy check as to whether or not a conversation is valid by referring to the message type of an immediately preceding message packet having the response ID in the message log;

if it is determined that the conversation is not valid, sending an error message packet to the sender of said message packet.

18. A program product that carries out a message processing method as set forth in claim 17, wherein the received message packet further contains describing language specifying information and content specifying information, wherein the step of selecting further comprises:

selecting the one or more interpreters in conformance to the ontology specifying information and the describing language specifying information contained in the message packet;

and wherein the step of interpreting further comprises:

interpreting the content which corresponds to the content specifying information contained in the message packet.

19. A program product that carries out a message processing method for execution by a message processor having a plurality of different interpreters and an interpreter control table for controlling a plurality of ontology specifying information which corresponds to respective ones of said plurality of different interpreters, said method comprising the steps of:

receiving a message packet, transmitted from a mobile agent, containing ontology specifying information and a content;

determining whether an interpreter corresponding to the ontology specifying information contained in said message packet has been registered in said interpreter control table;

determining, if no corresponding interpreter has been registered, whether an interpreter corresponding to the ontology specifying information contained in said message packet is available in said message processor;

registering, if an interpreter corresponding to the ontology specifying information contained in said message packets is available in said message processor, said corresponding interpreter in said interpreter control table;

interpreting the content contained in said message packet by means of said corresponding interpreter; and determining if response identification in a message packet is for a new conversation, and if so generating and new conversation thread, and if for an existing conversation moving control to a corresponding conversation thread.

20. A program product that carries out a message processing method for execution by a message processor having a plurality of different interpreters, a plurality of different analysis execution parts, and an analysis execution part control table for controlling the plurality of different analysis execution parts in association with analysis execution part specifying information, said method comprising the steps of:

receiving a message packet transmitted from a mobile agent and containing analysis execution part specifying information and a content;

determining whether the analysis execution part corresponding to the analysis execution part specifying information contained in the received message packet has been registered in the analysis execution part control table;

if it is determined that said analysis execution part corresponding to the analysis execution part specifying information has not been so registered, determining whether it is available in the message processor;

if it is determined that said analysis execution part is available in the message processor, registering said analysis execution part in the analysis execution part control table; and determining if response identification in a message packet is for a new conversation, and if so generating and new conversation thread, and if for an existing conversation moving control to a corresponding conversation thread.

* * * * *